(12) United States Patent
Amarilio et al.

(10) Patent No.: US 9,785,605 B2
(45) Date of Patent: Oct. 10, 2017

(54) PREDEFINED STATIC ENUMERATION FOR DYNAMIC ENUMERATION BUSES

(71) Applicant: QUALCOMM Incorporated, San Diego, CA (US)

(72) Inventors: Lior Amarilio, Yokneam (IL); Joseph Robert Fitzgerald, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 302 days.

(21) Appl. No.: 14/533,240

(22) Filed: Nov. 5, 2014

(65) Prior Publication Data

US 2016/0124892 A1 May 5, 2016

(51) Int. Cl.
*G06F 13/40* (2006.01)
*G06F 13/42* (2006.01)
*G06F 13/364* (2006.01)
*G06F 9/44* (2006.01)
*H04L 12/403* (2006.01)

(52) U.S. Cl.
CPC ........ *G06F 13/4282* (2013.01); *G06F 9/4418* (2013.01); *G06F 13/364* (2013.01); *G06F 13/404* (2013.01); *H04L 12/403* (2013.01); *Y02B 60/1228* (2013.01); *Y02B 60/1235* (2013.01)

(58) Field of Classification Search
None
See application file for complete search history.

(56) References Cited

U.S. PATENT DOCUMENTS

| 5,768,277 | A | 6/1998 | Ohno et al. |
| 7,292,876 | B2 | 11/2007 | Bosch et al. |
| 7,774,528 | B2 * | 8/2010 | Deshpande ......... G06F 13/4291 710/106 |
| 8,775,707 | B2 | 7/2014 | Poulsen |
| 9,436,633 | B2 * | 9/2016 | Segev ..................... G06F 13/36 |
| 2010/0191995 | A1 | 7/2010 | Levy et al. |
| 2010/0306431 | A1 | 12/2010 | Adkins et al. |
| 2013/0058495 | A1 | 3/2013 | Furst et al. |
| 2013/0322461 | A1 | 12/2013 | Poulsen |

OTHER PUBLICATIONS

International Search Report and Written Opinion for PCT/US2015/054857, dated Jan. 28, 2016, 10 pages.
Second Written Opinion for PCT/US2015/054857, dated Oct. 6, 2016, 5 pages.
International Preliminary Report on Patentability for PCT/US2015/054857, dated Mar. 13, 2017, 18 pages.

* cited by examiner

*Primary Examiner* — Cheng-Yuan Tseng
(74) *Attorney, Agent, or Firm* — Withrow & Terranova, PLLC

(57) ABSTRACT

Predefined static enumeration systems and processes for dynamic enumeration buses are disclosed. In one aspect, the dynamic enumeration bus may be a SOUNDWIRE™ bus. Slave devices are provided predefined device numbers which are provided to a master. The master uses the provided predefined device number to populate an address table. By providing the predefined device numbers, an iterative enumeration process may be reduced or eliminated, saving time and/or power.

30 Claims, 7 Drawing Sheets

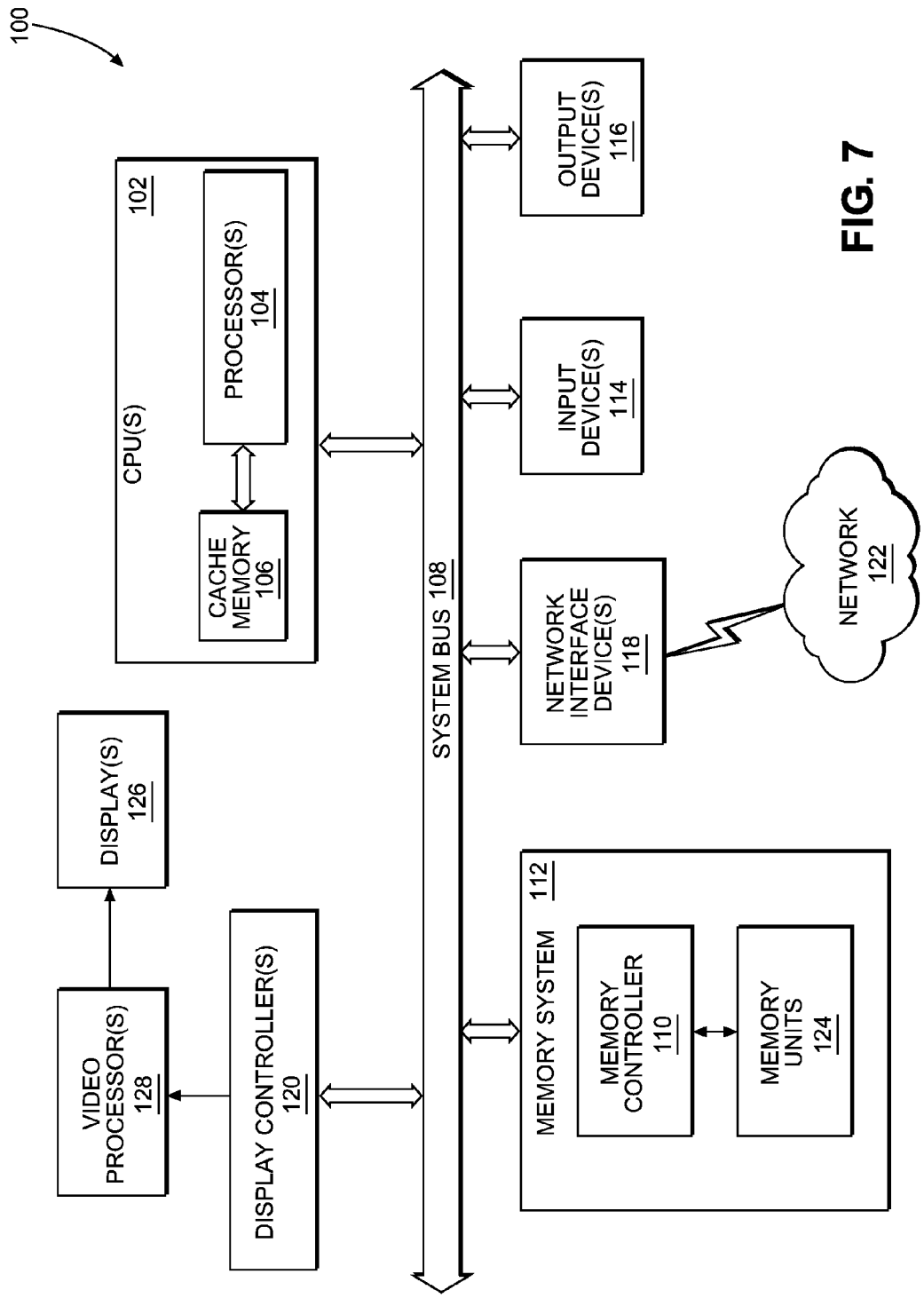

PREDEFINED STATIC ENUMERATION FOR DYNAMIC ENUMERATION BUSES

BACKGROUND

I. Field of the Disclosure

The technology of the disclosure relates generally to a data bus and more particularly to a SOUNDWIRE™ data bus.

II. Background

Mobile electronic devices, such as mobile phones and computer tablets (i.e., "mobile terminals"), have become common in contemporary society for supporting various everyday uses. These electronic devices include a microphone and speakers. Typical microphones and speakers used in electronic devices have analog interfaces, requiring dedicated two (2) port wiring to connect each device. However, electronic devices may include multiple audio devices, such as multiple microphones and/or speakers. Thus, it may be desired to allow for a microprocessor or other control device in such electronic devices to be able to communicate audio data to multiple audio devices over a common communication bus. Further, it may also be desired to provide a defined communication protocol for transporting digital data relating to audio channels to different audio devices in an electronic device over a common communication bus.

In this regard, the MIPI® Alliance has announced SOUNDWIRE™ as a communication protocol for transporting data relating to audio channels to different audio devices associated with an electronic device. In SOUNDWIRE, one SOUNDWIRE master interface allows a master electronic device ("master" or "master device"), or monitor communicatively coupled thereto, to communicate over a common communication bus with up to eleven slave electronic devices ("slaves" or "slave devices") coupled to SOUNDWIRE slave interfaces. As of this writing, the current version of SOUNDWIRE is revision 0.6-r02, which was made internally available on May 6, 2014 to MIPI Alliance members through the MIPI SharePoint file server.

SOUNDWIRE defines a procedure for slaves to connect to the SOUNDWIRE bus. The procedure involves an iterative process for slaves to receive bus specific addresses to avoid data collision. This process is sometimes referred to as enumeration because the master assigns to each slave a device number comprising a unique number between one (1) and eleven (11). Once all the slaves have been enumerated, normal operation of the SOUNDWIRE bus may occur. While effective at avoiding data collisions, the iterative process is relatively time consuming and must be repeated each time a device is powered on. Further, the iterative process generates duplicative commands which consume power. Such power consumption may be undesirable for battery powered mobile terminals.

SUMMARY OF THE DISCLOSURE

Aspects disclosed in the detailed description include predefined static enumeration systems and processes for dynamic enumeration buses. In an exemplary aspect, the dynamic enumeration bus may be a SOUNDWIRE™ bus. Slave devices are provided predefined device numbers, which are provided to a master. The master uses the provided predefined device numbers to populate an address table. By providing the predefined device numbers, an iterative enumeration process may be reduced or eliminated, saving time and/or power.

In this regard in one aspect, a method of controlling communication between a master and a slave device over a SOUNDWIRE bus is disclosed. The method comprises broadcasting, over the SOUNDWIRE bus, a command from the master to set a corresponding device number to a predefined device number stored in the slave device. The method also comprises enumerating, at the master, the slave device using the predefined device number.

In another aspect, a method of enumerating a SOUNDWIRE system is disclosed. The method comprises coupling a slave device to a SOUNDWIRE communication bus. The method also comprises providing a predefined device number to a master through the SOUNDWIRE communication bus.

In another aspect, a method of enumerating a SOUNDWIRE system is disclosed. The method comprises detecting a slave device being coupled to a SOUNDWIRE communication bus. The method also comprises receiving a predefined device number from the slave device through the SOUNDWIRE communication bus.

In another aspect, a SOUNDWIRE master is disclosed. The SOUNDWIRE master comprises a bus interface configured to be coupled to a SOUNDWIRE communication bus. The SOUNDWIRE master also comprises a control system operatively coupled to the bus interface. The control system is configured to detect a slave device being coupled to the SOUNDWIRE communication bus. The control system is further configured to receive a predefined device number from the slave device through the SOUNDWIRE communication bus.

In another aspect, a SOUNDWIRE slave device is disclosed. The SOUNDWIRE slave device comprises a bus interface configured to be coupled to a SOUNDWIRE communication bus. The slave device also comprises a control system operatively coupled to the bus interface. The control system is configured to couple the bus interface to the SOUNDWIRE communication bus. The control system is also configured to provide a predefined device number to a master through the SOUNDWIRE communication bus.

In another aspect, a SOUNDWIRE system is disclosed. The SOUNDWIRE system comprises a SOUNDWIRE communication bus. The SOUNDWIRE system also comprises a slave device. The slave device comprises a slave bus interface coupled to the SOUNDWIRE communication bus. The slave device also comprises a device identification number. The slave device also comprises a predefined device number distinct from the device identification number. The SOUNDWIRE system also comprises a master. The master comprises a master bus interface coupled to the SOUNDWIRE communication bus. The master also comprises a control system operatively coupled to the master bus interface. The control system is configured to detect the slave device coupling to the SOUNDWIRE communication bus. The control system is also configured to receive the predefined device number from the slave device.

BRIEF DESCRIPTION OF THE FIGURES

FIG. 7 is a block diagram of an exemplary processor-based system that can include the SOUNDWIRE system of FIG. 5.

DETAILED DESCRIPTION

Figure 1:
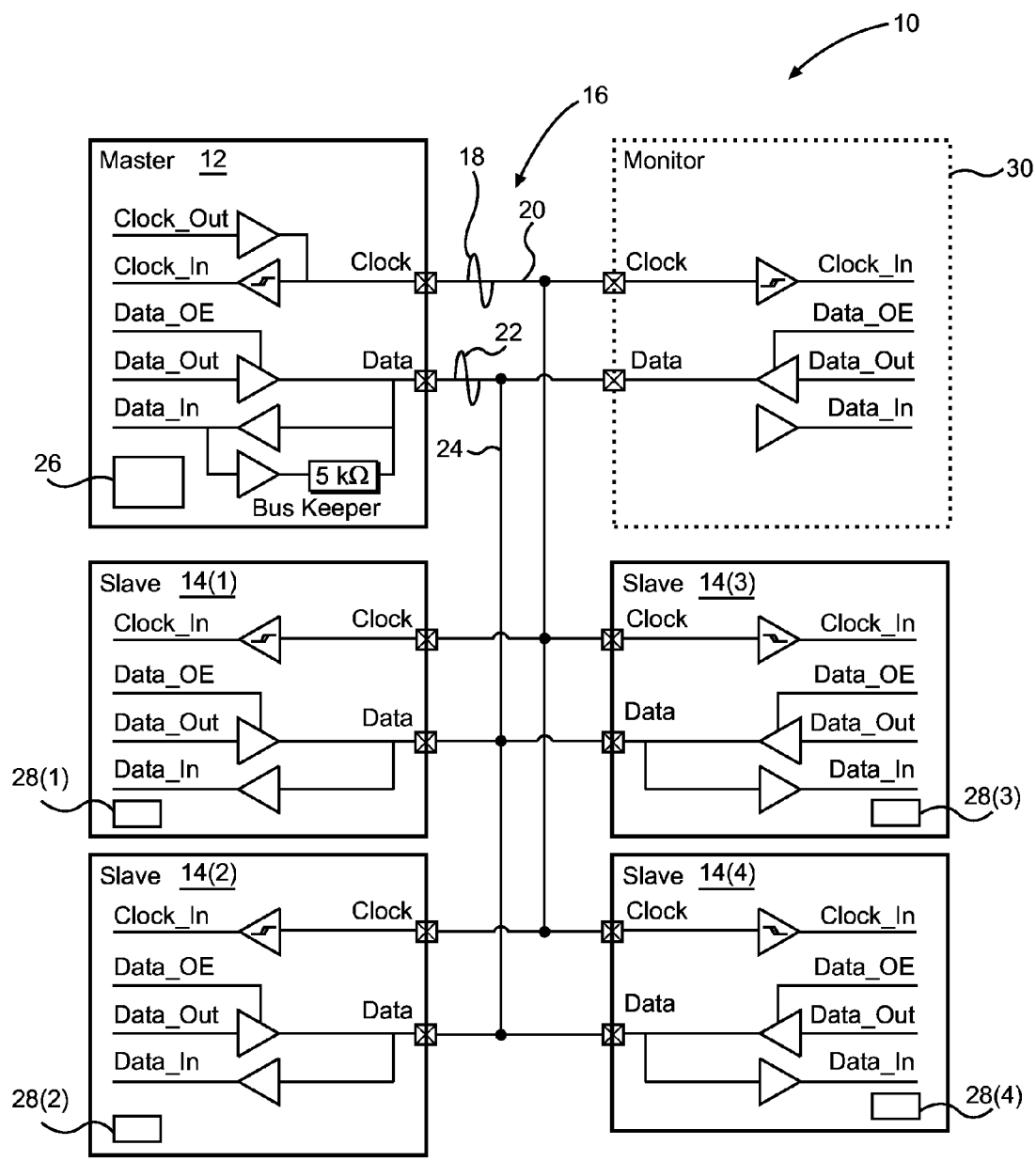
FIG. 1 is a block diagram of a conventional SOUNDWIRE™ system.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include predefined static enumeration systems and processes for dynamic enumeration buses. In an exemplary aspect, the dynamic enumeration bus may be SOUNDWIRE™ bus. Slave devices are provided predefined device numbers which are provided to the master. The master uses the provided predefined device number to populate an address table. By providing the predefined device numbers, an iterative enumeration process may be reduced or eliminated, saving time and/or power.

Before addressing particular aspects of the present disclosure a brief overview of a conventional SOUNDWIRE system and conventional enumeration process are discussed with reference to FIGS. 1-2B. Exemplary aspects of the present disclosure are discussed below beginning with FIG. 3.

In this regard, FIG. 1 is a block diagram of an exemplary SOUNDWIRE system 10 having one (1) master 12 and four (4) slave devices 14(1)-14(4) communicatively coupled to a SOUNDWIRE communication bus 16 as SOUNDWIRE-compatible electronic devices by respective bus interfaces (not illustrated). In an exemplary aspect, the slave devices 14(1)-14(4) may be microphones, speakers, or other audio devices. The master 12 communicates with the slave devices 14(1)-14(4) using two (2) signals: a clock signal 18 communicated over a common clock wire 20, and a data signal 22 communicated on a common data wire 24 ("DATA 24") of the SOUNDWIRE communication bus 16. The master 12 generates a CLOCK_OUT signal and the master 12 and slave devices 14(1)-14(4) receive the CLOCK_IN signal from the clock wire 20. Likewise, the master 12 and each of the slave devices 14(1)-14(4) have respective DATA_IN and DATA_OUT signals. While only four slave devices 14(1)-14(4) are illustrated in FIG. 1, it should be appreciated that the SOUNDWIRE specification supports up to eleven (11) slave devices 14 per master 12 and thus, such slave devices 14 are sometimes generically referred to as slave devices 14 or slave devices 14(1)-14(N), where N may be an integer between one and eleven. It should be appreciated that the master 12 may have a control system 26 associated therewith, which may be a hardware implemented processor with associated software stored in memory associated with the processor. In an exemplary aspect, the control system 26 is part of the system on a chip (SoC) of the master 12. In an alternate exemplary aspect, the control system 26 may be associated with a central processor for the computing device that includes the SOUNDWIRE system 10. In further exemplary aspects, the slave devices 14(1)-14(4) each have a respective slave control system 28(1)-28(4). In a further exemplary aspect, a monitor 30 may optionally be present and attached to the SOUNDWIRE communication bus 16. Notably, while this aspect illustrates various elements within the master 12 and the slave devices 14(1)-14(4), other aspects may include alternative elements or configurations and achieve similar functionality.

With continuing reference to FIG. 1, the SOUNDWIRE system 10 employs a modified Non-Return-to-Zero-Inverted ("NRZI") encoding scheme in conjunction with a double data rate ("DDR"), wherein the DATA 24 is examined, and potentially driven, upon every transition of the clock signal 18. As a non-limiting example, the DATA 24 may be driven by the slave devices 14(1)-14(4) based on a corresponding data output enable signal ("DATA_OE") of each respective slave device 14(1)-14(4). Further information may be found in the SOUNDWIRE specification. As noted above, as of this writing, the current version of SOUNDWIRE is revision 0.6-r02, which was made internally available on May 6, 2014 to MIPI Alliance members through the MIPI Share-Point file server. As used herein, a "SOUNDWIRE" system, bus, master, device, or the like refers to such an element that conforms at least to the May 6, 2014 version of the SOUNDWIRE specification.

Figure 2A:
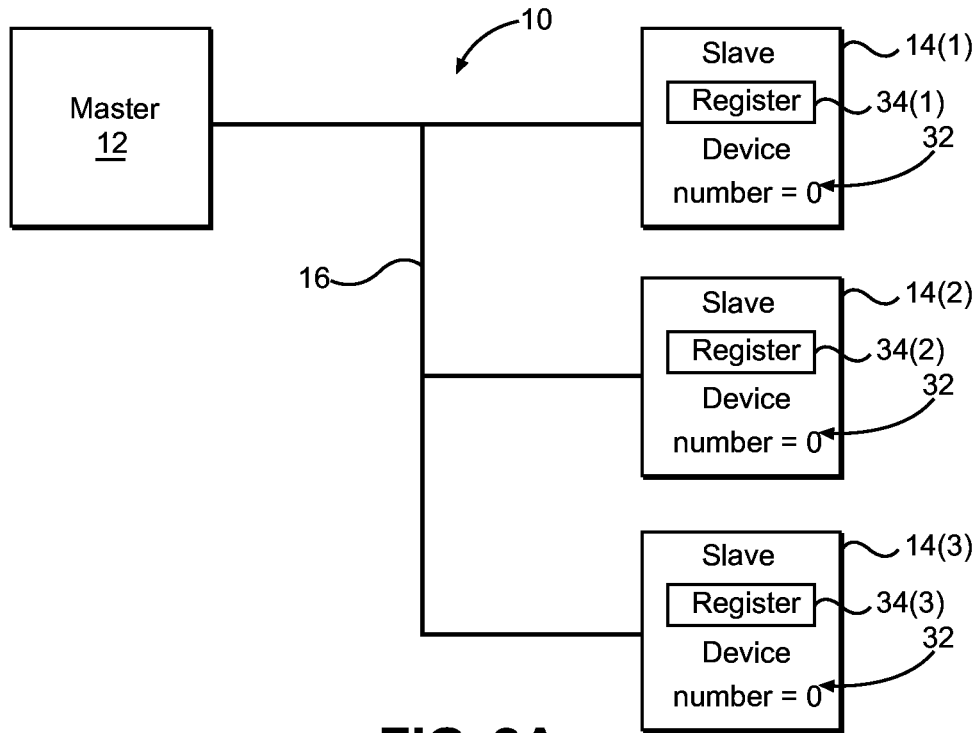
FIG. 2A is a block diagram of a conventional SOUNDWIRE system before enumeration.

With reference to FIG. 2A, and as further set forth in the SOUNDWIRE specification, at a power up event or after a reset event, the slave devices 14(1)-14(3) (generically, "slave device 14") are not initially attached to the SOUNDWIRE communication bus 16. As illustrated, there are three slave devices 14(1)-14(3), but as noted above, there may be up to eleven (11) such slave devices 14. Each slave device 14(1)-14(3) initially synchronizes to the SOUNDWIRE communication bus 16, and once this synchronization is successful, the slave device 14(1)-14(3) reports a device number 32 of zero (0) to the master 12. That is, all newly attached slave devices 14(1)-14(3) report a device number 32 of zero (0). The master 12 performs a sequence of operations that reads device identification number from device_id registers 34(1)-34(3) of the slave devices 14(1)-14(3). Typically, each slave device 14 has six (6) device_id registers 34 to provide the unique device identification for the slave device 14 (e.g., slave device 14(1) has six (6) device_id registers 34(1), although only one block is shown). The master 12 picks the slave device 14 with the highest value in the device_id register 34 and assigns that slave device 14 a first address (device number) between one (1) and eleven (11). The master 12 then receives the device number 32 of zero from the remaining new slave devices 14. The master 12 reads the device identification number from the device_id registers 34 of the slave devices 14 that have reported zero device number 32. The slave device 14 with the highest value in the device_id register 34 is then assigned a second unique address (device number) between one (1) and eleven (11). This process repeats until no slave devices 14 report a device number of zero (0).

Figure 2B:
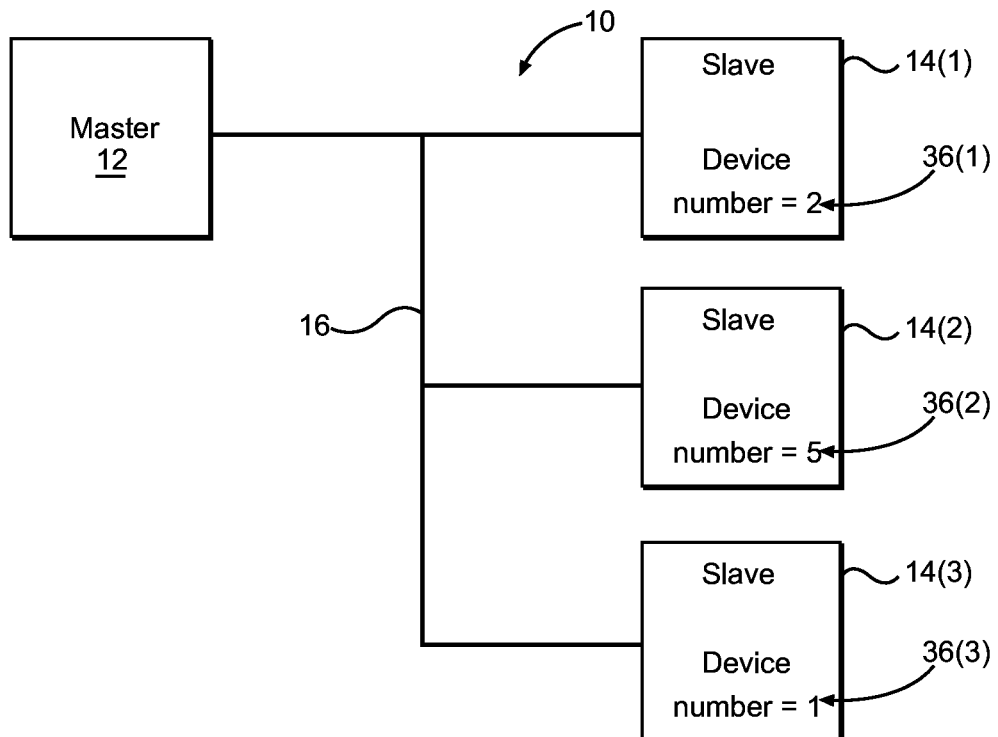
FIG. 2B is a block diagram of a conventional SOUNDWIRE system after enumeration.

With reference to FIG. 2B, the SOUNDWIRE system 10 has finished the process described above, and slave device 14(1) has been assigned a device number 36(1) of two (2), the slave device 14(2) has been assigned a device number 36(2) of five (5), and the slave device 14(3) has been assigned a device number 36(3) of one (1). As noted, all the assigned device numbers 36 are between one (1) and eleven (11) and are unique between the slave devices 14 on the SOUNDWIRE communication bus 16 and may be stored in a device number register (not shown). While the enumeration process set forth in the SOUNDWIRE specification prevents collisions and allows for each slave device 14 to communicate properly on the SOUNDWIRE communication bus 16, it is readily apparent that there are many duplicative messages as the enumeration process iterates through each device number 36 assignment. Such duplicative messages add latency to the initialization of the system and consume power. In battery powered devices, such power consumption is undesirable because it may shorten the effective battery life of the device.

Exemplary aspects of the present disclosure reduce duplicative messages in an enumeration process by providing slave devices with a predefined device number. The predefined device number is in addition to a device identification number stored in a device_id register. By providing the predefined device number for a slave, at least that slave may be taken out of an iterative enumeration process as explained below. Taking such slaves out of the iterative enumeration process lowers the number of iterations, thereby reducing latency and saving power.

Figure 3:
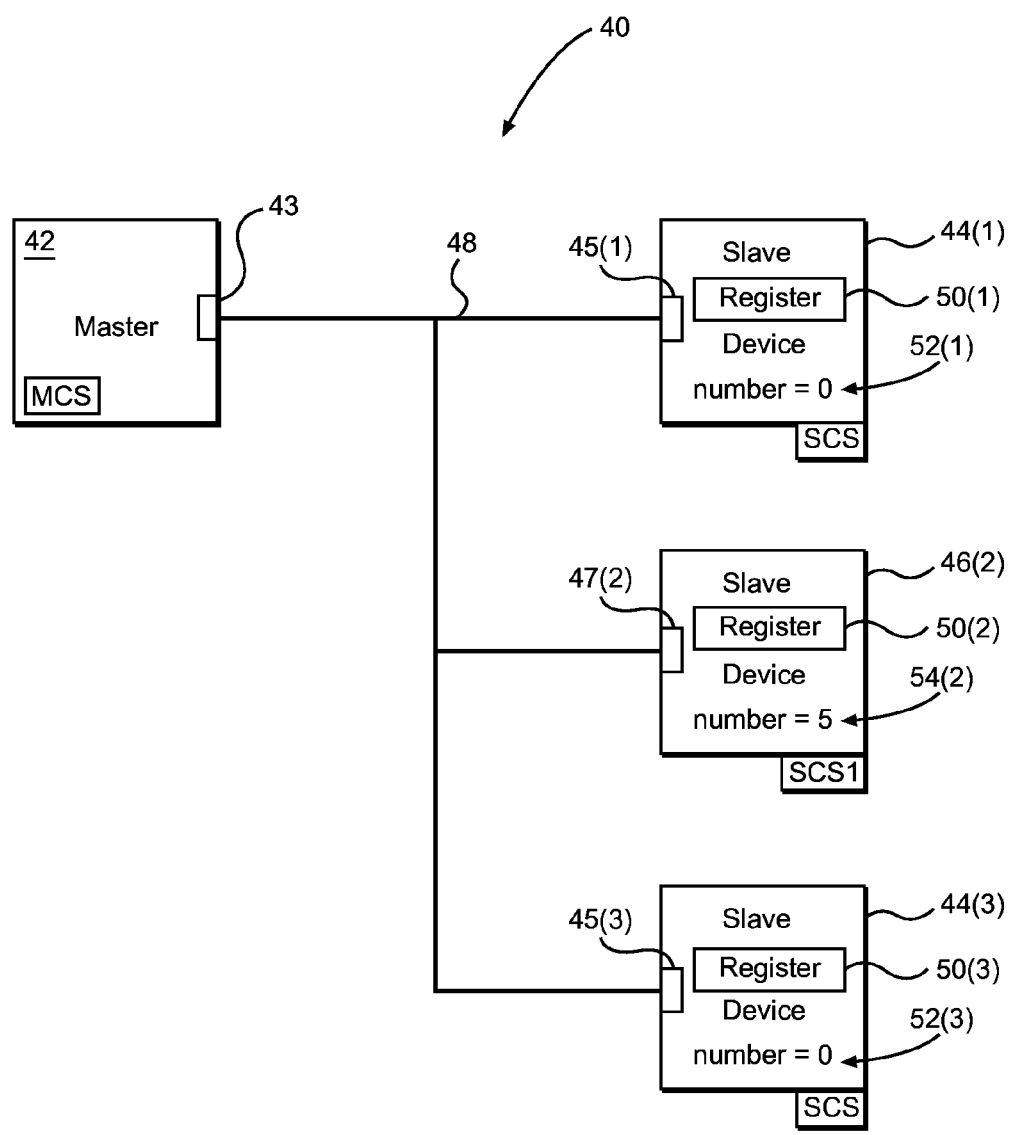
FIG. 3 is a block diagram of a SOUNDWIRE system before enumeration according to an exemplary aspect of the present disclosure where at least one slave has a predefined device number.

In this regard, FIG. 3 illustrates a SOUNDWIRE system 40 according to an exemplary aspect of the present disclosure. The SOUNDWIRE system 40 includes a master 42 and three slave devices 44(1), 44(3), and 46(2) connected to a SOUNDWIRE communication bus 48 through bus interfaces 43, 45(1), 45(3), and 47(2) respectively. The master 42 may have a master control system (MCS), which may be hardware and/or software to implement exemplary aspects of the present disclosure. The slave devices 44(1) and 44(3) may have slave control systems (SCSs). The slave device 46(2) may have a slave control system (SCS1), which may be hardware and/or software to implement exemplary aspects of the present disclosure. While only three slave devices 44(1), 44(3), and 46(2) are illustrated, it should be appreciated that up to eleven (11) slave devices 44, 46 may be connected to the SOUNDWIRE communication bus 48. Further, a monitor (not shown), like the monitor 30 of FIG. 1, may be attached to the SOUNDWIRE communication bus 48. Each slave device 44(1), 44(3), and 46(2) includes respective device_id registers 50(1)-50(3) that have the unique device identification stored therein. As noted above, while only a single block is shown for each device_id register 50(1)-50(3), in an exemplary aspect, each block represents six (6) registers. As illustrated, slave devices 44(1) and 44(3) are conventional slave devices and initially have device number 52(1) and 52(3) set to zero (0). However, the slave device 46(2) has a predefined device number 54(2) set, for example, to five (5). While only one slave device 46(2) is shown as having a predefined device number 54(2), it should be appreciated that other slave devices, such as slave devices coupled to the SOUNDWIRE communication bus 48, may also have predefined device numbers. In an exemplary aspect, not shown, all slave devices coupled to the SOUNDWIRE communication bus 48 include a predefined device number (e.g., 54).

With continued reference to FIG. 3, the predefined device number 54(2) may be defined through a variety of techniques. In a first exemplary aspect, firmware in the slave device 46(2) is set to a specific device number. In a second exemplary aspect, firmware is provided two device numbers, and a physical pin associated with the slave device 46(2) is set to a low or a high value. If the pin is set high, the first of the two device numbers is provided. If the pin is set low, the second of the two device numbers is provided. In a third exemplary aspect, a programmable memory element may be configured using some transport bus (not shown) before the slave device 46(2) is attached to the SOUNDWIRE communication bus 48. It should further be appreciated that the slave device 46(2) may be configured to provide the predefined device number 54(2) when initially queried by the master 42 or may be configured to provide an initial device number of zero when attached to the SOUNDWIRE communication bus 48 and subsequently provide the predefined device number 54(2) to the master 42 as part of an enumeration process described in greater detail below with reference to FIG. 4. If the slave device 46(2) initially provides a device number of zero, the slave device 46(2) may have an additional register from which the zero device number is initially read. The additional register may subsequently be overwritten with the predefined device number 54(2) or the register holding the predefined device number 54(2) may be used.

In an alternate exemplary aspect of the present disclosure, an imp-def register may be provided. The imp-def register is a write-only register implemented in devices that support a pre-enumerated value. If a write command to this imp-def register is taking place, the imp-def register will activate an internal command that will immediately update the device number to the predefined device number 54(2). If no write command is executed to the imp-def register, the behavior of the device may follow the traditional processes laid out in the standard (i.e., the full- and long-enumeration process).

Figure 4:
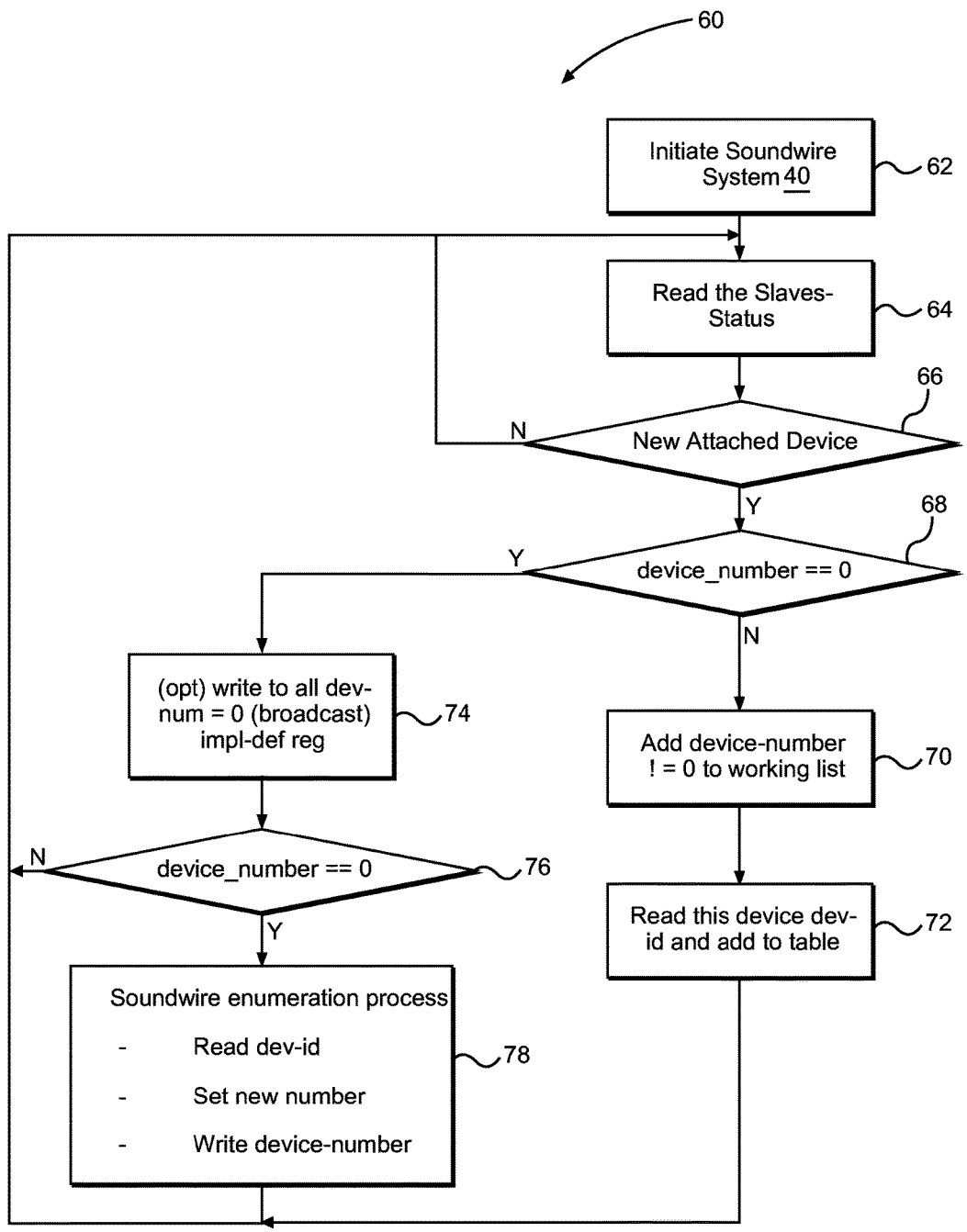
FIG. 4 is a flow chart of an enumeration process according to an exemplary aspect of the present disclosure.

Providing the predefined device number (e.g., 54(2)) allows the enumeration process of the SOUNDWIRE specification to be modified to take advantage of the predefined device number. In this regard, FIG. 4 illustrates a process 60 for using slave devices (e.g., the slave device 46(2)) with predefined device numbers. The process 60 begins with the initiation of the SOUNDWIRE system 40 (block 62). The master 42 reads the status of the slave devices 44(1), 44(3), and 46(2) coupled to the SOUNDWIRE communication bus 48 (block 64). The status indicates if the slave devices 44(1), 44(3), and/or 46(2) are newly attached to the SOUNDWIRE communication bus 48. The master 42 determines if any of the slave devices 44(1), 44(3), and/or 46(2) are new (block 66). If none of the slave devices 44(1), 44(3), and/or 46(2) are new, the SOUNDWIRE system 40 operates normally, passing audio data across the SOUNDWIRE communication bus 48 as set forth in the SOUNDWIRE specification. If, however, one or more of the slave devices 44(1), 44(3), and/or 46(2) are new, the master 42 determines if any of the slave devices 44(1), 44(3), and/or 46(2) have a device number 52 that is zero (0) (block 68).

With continued reference to FIG. 4, as noted above, the slave device 46(2) may not provide an initial device number of zero (i.e., block 68 is answered negatively). In such an instance, the slave device 46(2) has provided the predefined device number 54(2) to the master 42, and the master 42 adds the predefined device number 54(2) to the working list stored in the master 42 (block 70). The master 42 then reads the device identification from the device_id register 50(2) and adds the device identification to a table 80 (block 72) (see FIG. 6).

If, however, the slave device 46(2) initially reports a device number of zero (i.e., block 68 is answered affirmatively), the master 42 broadcasts a command to all slave devices 44(1), 44(3), and 46(2) to write to an imp-def register. The imp-def register activates an internal command to update the device number with the predefined device number if available (block 74). If capable of doing so, the slave devices 44(1), 44(3), 46(2) write the predefined value to the device number register. The master 42 then reads the slave status, and therefore knows the device number 52 or 54 from the slave devices 44(1), 44(3), and 46(2) (block 76). If the device number 52 or 54 is not zero (i.e., the device number 54 was populated by the predefined device number 54(2)), the process 60 begins normal SOUNDWIRE operation and loops back to block 64. If, however, the device number 52 or 54 is still zero after the command issued in block 74, then a conventional SOUNDWIRE enumeration process (block 78) is performed where the device identification is read from the slave devices 44(1), 44(3), and a new device number is set and written to the slave device 44(1), 44(3). After enumeration, conventional SOUNDWIRE operation occurs.

With continued reference to FIG. 4, slave devices 46(2) that have the predefined device number (e.g., 54(2)) may interoperate with legacy systems by being responsive to the broadcast command in block 74. That is, a slave device 46(2) coupled to a SOUNDWIRE system 40 that does not recognize predefined device numbers would receive the broadcast command, but would ignore the broadcast command, and would be enumerated according to the conventional SOUNDWIRE specification enumeration process.

Figure 5:
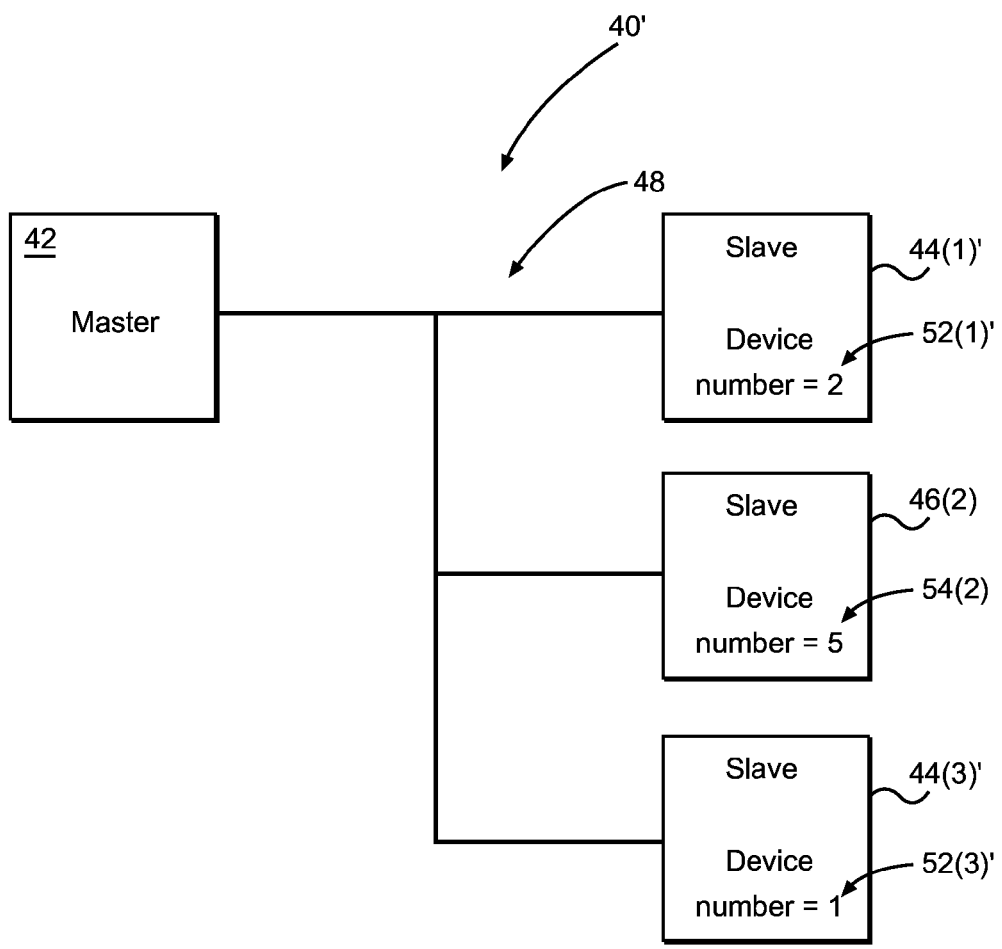
FIG. 5 is a block diagram of a SOUNDWIRE system after the enumeration process of FIG. 4.

After the process 60 is performed, the slave devices 44(1), 44(3), and 46(2) are all enumerated and the enumerated SOUNDWIRE system 40' is illustrated in FIG. 5. The slave device 46(2) still has the predefined device number 54(2). However, slave devices 44(1) and 44(3) have now been enumerated with device numbers 52(1)' and 52(3)' to make slave devices 44(1)' and 44(3)', respectively. Once enumerated, the SOUNDWIRE system 40' may conduct conventional SOUNDWIRE signaling.

Figure 6:
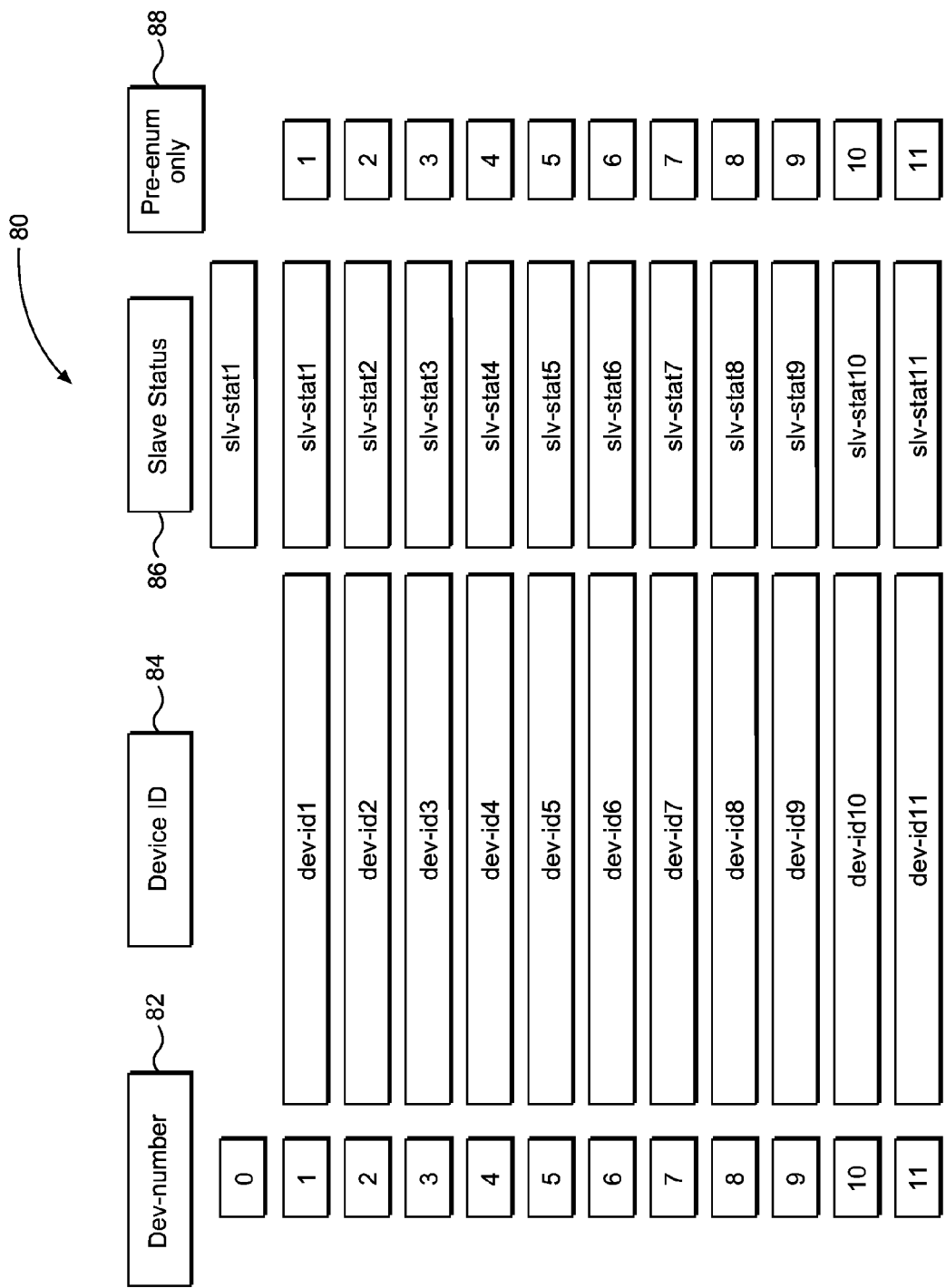
FIG. 6 is an exemplary table used by a master for holding device numbers of slaves attached to the SOUNDWIRE system of FIG. 5.

The master 42 may have a table 80, illustrated in FIG. 6, that sets forth device numbers in a device number field (Dev-number) 82, device identification in a device ID field 84, a slave status in a slave status field 86, and pre-enumeration numbers in a pre-enumeration field (Pre-enum) 88. If the slave device 44(1), 44(3), or 46(2) has a predefined device number, this predefined device number (e.g., 54(2)) is copied into the corresponding pre-enumeration field 88. Likewise, a newly enumerated device is added to the table 80 on the row corresponding to the newly assigned device number.

Note that if the SOUNDWIRE system 40 is placed into a sleep or standby mode, the SOUNDWIRE specification allows the slave devices 44(1), 44(3), 46(2) to remain enumerated. Aspects of the present disclosure do not change this. However, if the slave is detached from the SOUNDWIRE communication bus 48, the slave devices 44(1), 44(3), 46(2) may enumerate using the predefined device number as explained above.

While the above discussion has focused on SOUNDWIRE systems, aspects of the present disclosure are not so limited. Other dynamic enumeration schemes may benefit from the static, predefined device numbers and process for detecting and using the same of the present disclosure.

The predefined static enumeration systems and processes for dynamic enumeration buses, according to aspects disclosed herein, may be provided in or integrated into any processor-based device. Examples, without limitation, include a set top box, an entertainment unit, a navigation device, a communication device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

In this regard, FIG. 7 illustrates an example of a processor-based system 100 that can employ the SOUNDWIRE system 40 illustrated in FIGS. 3-5. In this example, the processor-based system 100 includes one or more central processing units (CPUs) 102, each including one or more processors 104. In an exemplary aspect of the present disclosure, the CPU(s) 102 may be a master 42. The CPU(s) 102 may have cache memory 106 coupled to the processor(s) 104 for rapid access to temporarily stored data. The CPU(s) 102 is coupled to a system bus 108 and can intercouple master and slave devices included in the processor-based system 100. The system bus 108 may be a SOUNDWIRE communication bus 48, as illustrated in FIG. 3. As is well known, the CPU(s) 102 communicates with these other devices by exchanging address, control, and data information over the system bus 108. For example, the CPU(s) 102 can communicate bus transaction requests to a memory controller 110 as an example of a slave device. Although not illustrated in FIG. 7, multiple system buses 108 could be provided.

Other master and slave devices can be connected to the system bus 108. As illustrated in FIG. 7, these devices can include a memory system 112, one or more input devices 114, one or more output devices 116, one or more network interface devices 118, and one or more display controllers 120, as examples. The input device(s) 114 can include any type of input device, including but not limited to input keys, switches, voice processors, etc. The output device(s) 116 can include any type of output device, including but not limited to audio, video, other visual indicators, etc. In an exemplary aspect, a SOUNDWIRE communication bus 48 may exist between multiple input devices 114 and output devices 116. The network interface device(s) 118 can be any devices configured to allow exchange of data to and from a network 122. The network 122 can be any type of network, including but not limited to a wired or wireless network, a private or public network, a local area network (LAN), a wireless local area network (WLAN), a wide area network (WAN), BLUETOOTH™, and the Internet. The network interface device(s) 118 can be configured to support any type of communication protocol desired. The memory system 112 can include one or more memory units 124.

The CPU(s) 102 may also be configured to access the display controller(s) 120 over the system bus 108 to control information sent to one or more displays 126. The display controller(s) 120 sends information to the display(s) 126 to be displayed via one or more video processors 128, which process the information to be displayed into a format suitable for the display(s) 126. The display(s) 126 can include any type of display, including but not limited to a cathode ray tube (CRT), a liquid crystal display (LCD), a light emitting diode (LED) display, a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The master devices, and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method of controlling communication between a master and a slave device over a dynamic enumeration audio bus, comprising:
    broadcasting, over the dynamic enumeration audio bus, a command from the master to set a corresponding device number to a predefined device number that is different from a device identification number, wherein the predefined device number is stored in the slave device; and
    enumerating, at the master, the slave device using the predefined device number such that the slave device has a static predefined device number used by the master to address the slave device in the dynamic enumeration audio bus, wherein the static predefined device number is a unique device number between one and eleven to avoid data collision.

2. The method of claim 1, further comprising initially coupling the slave device to the dynamic enumeration audio bus, wherein the dynamic enumeration audio bus comprises a SOUNDWIRE bus.

3. The method of claim 2, further comprising determining the slave device is newly attached to the SOUNDWIRE bus.

4. The method of claim 1, further comprising detecting the slave device has a device number of zero before broadcasting the command.

5. The method of claim 1, further comprising broadcasting the command to a second slave device.

6. The method of claim 5, further comprising determining that the second slave device still has a corresponding initial device number of zero after broadcasting the command.

7. The method of claim 6, further comprising reading the device identification number from the second slave device and setting a new device number for the second slave device.

8. The method of claim 1, further comprising placing a system associated with the dynamic enumeration audio bus in a sleep or standby mode.

9. The method of claim 1, further comprising setting the static predefined device number stored in the slave device.

10. The method of claim 9, wherein setting the static predefined device number comprises using a pin on the slave device.

11. The method of claim 9, wherein setting the static predefined device number comprises using firmware to set the static predefined device number.

12. The method of claim 9, wherein setting the static predefined device number comprises using a second bus to program a device number register of the slave device.

13. A method of enumerating an audio SOUNDWIRE system, comprising:
    coupling a slave device to a dynamic enumeration audio communication bus;
    providing a unique static predefined device number between one and eleven to a master through the dynamic enumeration audio communication bus, wherein the unique static predefined device number is different from a device identification number; and
    receiving subsequent communication from the master addressed to the slave device using the unique static predefined device number as a bus specific address for the slave device.

14. The method of claim 13, further comprising predefining the unique static predefined device number.

15. The method of claim 14, wherein predefining comprises setting the unique static predefined device number in firmware.

16. The method of claim 14, wherein predefining comprises using a pin to select between two predefined values.

17. The method of claim 14, wherein predefining comprises using a transport bus to set a value before coupling the slave device to the dynamic enumeration audio bus, wherein the dynamic enumeration audio bus comprises a SOUNDWIRE communication bus.

18. The method of claim 13, further comprising receiving a broadcast command from the master requesting the unique static predefined device number.

19. The method of claim 13, further comprising providing the unique static predefined device number to the master after initiation of the audio system.

20. The method of claim 19, further comprising providing the unique static predefined device number in response to an inquiry from the master.

21. A method of enumerating an audio system, comprising:
    detecting a slave device being coupled to a dynamic enumeration audio communication bus;
    receiving a predefined static device number that is unique and between one and eleven from the slave device through the dynamic enumeration audio communication bus, wherein the predefined static device number is different from a device identification number; and
    using the predefined static device number to address the slave device in subsequent communication so as to avoid data collisions.

22. The method of claim 21, further comprising initiating the audio system, wherein the audio system comprises a SOUNDWIRE system.

23. The method of claim 21, further comprising reading a slave status from the slave device.

24. The method of claim 21, further comprising reading a device number from the slave device.

25. The method of claim 24, wherein reading the device number comprises receiving the predefined static device number from the slave device.

26. The method of claim 21, further comprising broadcasting a command to the slave device to provide the predefined static device number.

27. The method of claim 21, further comprising enumerating other slave devices using an iterative process.

28. An audio master comprising:
    a bus interface configured to be coupled to a dynamic enumeration audio communication bus; and
    a control system operatively coupled to the bus interface and configured to:
        detect a slave device being coupled to the dynamic enumeration audio communication bus;
        receive a static predefined device number that is unique and between one and eleven from the slave device through the dynamic enumeration audio communication bus, wherein the static predefined device number is different from a device identification number; and
        use the static predefined device number to address the slave device in subsequent communication so as to avoid data collisions.

29. An audio slave device comprising:
    a bus interface configured to be coupled to a dynamic enumeration audio communication bus; and
    a control system operatively coupled to the bus interface and configured to:
        couple the bus interface to the dynamic enumeration audio communication bus;
        provide a static predefined device number that is unique and between one and eleven to a master through the dynamic enumeration audio communication bus, wherein the static predefined device number is different from a device identification number; and
        receive subsequent communication from the master addressed to the audio slave device using the static predefined device number as a bus specific address for the audio slave device.

30. An audio system comprising:
    a dynamic enumeration audio communication bus;
    a slave device comprising:
        a slave bus interface coupled to the dynamic enumeration audio communication bus;
        a device identification number; and
        a static predefined device number that is unique and between one and eleven distinct from the device identification number; and
    a master comprising:
        a master bus interface coupled to the dynamic enumeration audio communication bus;
        a control system operatively coupled to the master bus interface, the control system configured to:
            detect the slave device coupling to the dynamic enumeration audio communication bus;
            receive the static predefined device number from the slave device; and
            use the static predefined device number to address the slave device in subsequent communication so as to avoid data collisions.

* * * * *